June 5, 1934. J. McKEE 1,961,903
APPARATUS FOR MAKING GREASE
Filed Nov. 20, 1928 2 Sheets-Sheet 1

INVENTOR
James McKee

June 5, 1934.  J. McKEE  1,961,903
APPARATUS FOR MAKING GREASE
Filed Nov. 20, 1928  2 Sheets-Sheet 2

INVENTOR
James McKee
BY
Busser & Harding
ATTORNEYS.

WITNESS:

Patented June 5, 1934

1,961,903

UNITED STATES PATENT OFFICE 1,961,903

APPARATUS FOR MAKING GREASE

James McKee, Media, Pa., assignor to Sun Oil Company, Philadelphia, Pa., a corporation of New Jersey Application November 20, 1928, Serial No. 320,558

1 Claim. (Cl. 257—108)

My invention relates to improved apparatus for making grease.

My invention has for its object the provision of apparatus by which a grease of superior quality and more uniform may be produced with a saving of time and at lower pressure than has been heretofore required.

In the production of grease by methods heretofore known, it has been customary to first effect saponification of the fat ingredient and then add the oil ingredient and water to the saponified fat. The grease resultant from the methods of production heretofore known has not been entirely satisfactory in respect, more particularly, to clarity and uniformity, and the addition of water with the oil ingredient heretofore necessary gives rise to various problems and difficulties from the manufacturing standpoint.

Now, in accordance with my invention, I provide a novel apparatus for the production of grease and which with avoidance of the addition of water as such, enables the production of grease of high quality and substantial uniformity in a minimum of time and with the use of much lower pressure than heretofore required.

In the practical adaptation of the apparatus embodying my invention, the usual grease making fats, as horse oil, tallow, stearic acid, oleic acid, lard oil, cottonseed oil, castor oil, corn oil, etc., or their fatty acids, or mixtures thereof, may be used and the ingredients of the grease, including the fat, saponifying agent and oil are simultaneously processed at suitable temperatures and pressures, as will more fully appear hereinafter.

The details of the means embodying my invention will, it is believed be readily understood in connection with a detailed description of a preferred form of apparatus embodying my invention and shown in the accompanying drawings, in which.

Figure 1:
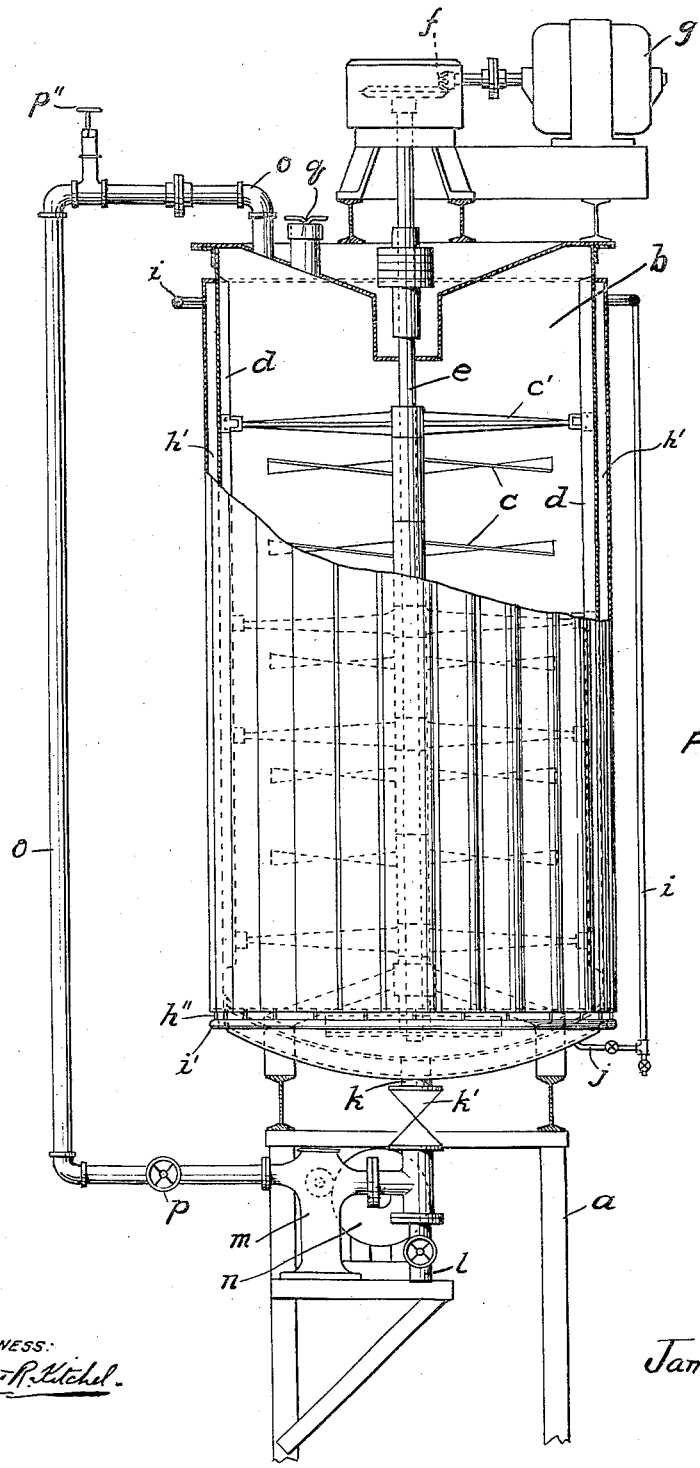
Figure 1 is a view, in elevation and partly in section, of an apparatus embodying my invention.
Figure 2:
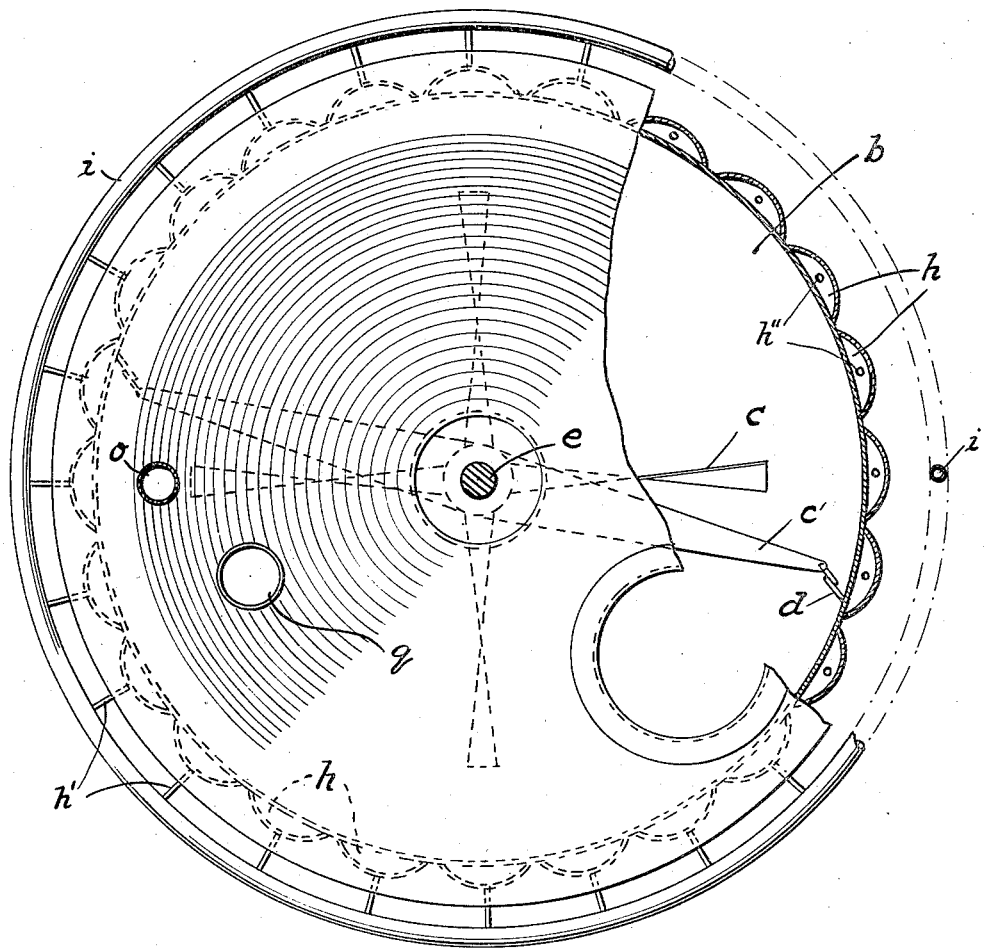
Figure 2 is a plan view, partly broken away and partly in section, of the kettle shown in Fig. 1.

In the drawings $a$ indicates a base from which the kettle $b$ is supported. The kettle $b$ is provided with a stirring or agitating device comprising a vertical shaft, or spindle, $e$ upon which are mounted arms $c$, of a length substantially less than the diameter of the kettle, and arms $c'$, of greater length than arms $c$ and connected at their ends to scrapers $d$ in contact with the walls of the kettle. The shaft or spindle $e$ is suitably journalled and is driven through gearing $f$ by a motor $g$, mounted on top of the kettle.

The kettle is provided externally with separate adjacent arcuate vertically extending jacket members $h$, adapted to be individually supplied with steam through pipes $h'$ connected to a circular header $i$ in turn connected with a source of steam through pipe $j$ from which a branch $j'$ is led into and affords a supply of steam to a bottom jacket chamber of the kettle. The jacket members $h$ are connected by pipes $h''$ at their lower ends to a header $i'$ through which steam and condensate are discharged.

To the bottom of the kettle, which is preferably dished as shown, is connected an outlet pipe $k$, provided with a valve $k'$, and connected in turn to a T fitting, one end of which is connected to a draw off line $l$ provided with a valve and leading to a suitable receptacle for the product, and the third end of which is connected to the intake of a suitable pump $m$ driven, through gearing, by a motor $n$.

The discharge of pump $m$ is connected to one end of a pipe $o$, provided with valves $p$ and $p''$, and the other end of which is connected to the kettle at its top. The top of the kettle is provided with a suitably closed opening $q$ through which the kettle may be charged.

In carrying out the method in accordance with my invention, utilizing the apparatus embodying my invention and described above, the kettle $b$ is charged with the requisite ingredients in desirable proportion, for example, 86% mineral oil, 12% fat, 1.5% calcium hydrate and 0.25% caustic soda. During the charging the stirring or agitating device is operated, as is also the pump $m$ which, the valve $k$ and the valves $p$, $p''$ in pipe $o$ being open, draws from the bottom of the kettle and discharges into the top, thus as the kettle is charged the ingredients are both stirred or agitated and circulated in the kettle.

When the kettle is charged steam is admitted to the jackets $h$ to heat the contents of the kettle while the agitation and circulation thereof is continued.

When the fat begins to saponify the pressure within the kettle rises, the kettle being closed after charging is completed, and steam is maintained in the jackets $h$ until the pressure in the kettle rises to about 20 lbs. per square inch, as observed from a suitable gauge. When the pressure in the kettle reaches about 20 pounds the temperature of the contents will be about 235° F.– 240° F. and the volume of steam to the jackets is then decreased, after which the pressure within the kettle may rise to upwards of 50 pounds per square inch. The requisite treatment will be completed in about one-half hour from the admission of steam to the jackets $h$, after which the contents of the kettle are permitted to cool down to about 150° F.–160° F. and finished grease then unloaded or drawn off from the kettle.

In the carrying out of the method as above described, it is desirable that the agitation and circulation be continued throughout the processing of the grease and it will be noted that the moisture formed in saponification is sufficient to hold the finished product in perfect solution.

In carrying out the method in accordance with my invention, it will be noted that various fats may be used and that for calcium hydrate I may substitute other hydrated salts, as for example, barium oxide, lead oxide, etc., and the like, while for caustic soda I may substitute other alkalies such as, for example, caustic potash, etc., and the like. The mineral oil used may be any of the usual paraffin base or asphalt base petroleum oils having Saybolt viscosities between 100 and 2000 at 100° F. It will also be noted that the formula given herein by way of illustration may be widely varied for the production of greases having desired characteristics.

By virtue of my invention a batch of grease may be made in about four hours, including loading and unloading the kettle as compared to about eight hours by prior methods, and the operation is greatly simplified due to the requirement for but a single step, the lower pressure and the non-addition of water as such. Further, the product will be found of greater clarity and more uniform than that produced by prior methods for producing grease.

The method herein described is claimed in my application Ser. No. 439,609, filed March 28, 1930.

Having now fully described my invention, what I claim and desire to protect by Letters Patent is:

Apparatus for compounding grease comprising a cylindrical pressure vessel, a multiplicity of narrow, transversely curved plates having their edges secured to the outer wall of the cylindrical pressure vessel and their end openings closed to form a multiplicity of longitudinally disposed axial chambers for the reception of heating medium under pressure and to reinforce said cylindrical pressure vessel.

JAMES McKEE.